(12) United States Patent
Kanada et al.

(10) Patent No.: US 7,640,014 B2
(45) Date of Patent: Dec. 29, 2009

(54) MOBILE STATION AND METHOD FOR CONTROLLING MOBILE STATION SIDE COMMUNICATION, BASE STATION AND METHOD FOR CONTROLLING BASE STATION SIDE COMMUNICATION, AND COMMUNICATION SYSTEM

(75) Inventors: Naoki Kanada, Tokyo (JP); Kakuichi Shiomi, Tokyo (JP); Atsushi Yamagishi, Kanagawa (JP); Naritomo Meguro, Kanagawa (JP)

(73) Assignees: Electronic Navigation Research Institute, Tokyo (JP); Mitsubishi Space Software Co., Ltd., Tokyo (JP)

( * ) Notice: Subject to any disclaimer, the term of this patent is extended or adjusted under 35 U.S.C. 154(b) by 768 days.

(21) Appl. No.: 10/557,111

(22) PCT Filed: Jun. 1, 2004

(86) PCT No.: PCT/JP2004/007509

§ 371 (c)(1),
(2), (4) Date: Nov. 16, 2005

(87) PCT Pub. No.: WO2004/110090

PCT Pub. Date: Dec. 16, 2004

(65) Prior Publication Data

US 2007/0010276 A1    Jan. 11, 2007

(30) Foreign Application Priority Data

Jun. 3, 2003 (JP) .............................. 2003-157645

(51) Int. Cl.
 *H04W 4/00* (2009.01)
(52) U.S. Cl. ................. 455/422.1; 455/404.1; 455/522; 455/450; 370/318
(58) Field of Classification Search ... 455/404.1–404.2, 455/455, 422.1, 550.1–552.1, 560–561, 525, 455/522, 69; 370/310, 311, 318, 338, 328, 370/329
See application file for complete search history.

(56) References Cited

U.S. PATENT DOCUMENTS 3,986,119 A   10/1976   Hemmer, Jr. et al.
(Continued)

FOREIGN PATENT DOCUMENTS

JP         50-99403 A    8/1975
(Continued)

OTHER PUBLICATIONS

JP2001143182MT (JP 2001143182 -translation), Ichihana Masahiro, May 25, 2001.*
(Continued)

*Primary Examiner*—Kamran Afshar
(74) *Attorney, Agent, or Firm*—Birch, Stewart, Kolasch & Birch, LLP

(57) ABSTRACT

When emergency communication etc. is sent, it aims at preferentially dealing with the emergency communication etc. by a simple and effective method. It is a communication system in which a base station 100 and a mobile station 200*a* establish communication for emergency situation, in time of emergency, wherein the mobile station 200*a* switches an output adjustment from the normal mode to the emergency mode and sends the communication for emergency situation at the largest output possible. The base station 100 receives a strong radio wave from the mobile station 200*a* which sent the communication for emergency situation. The base station 100 continues to output suppression signals for suppressing signal intensity to the other mobile stations. The other mobile stations are suppressed by the near-far effect, and it becomes impossible for the base station 100 to receive communication except for the communication for emergency situation. Only the mobile station 200*a* which sent the communication for emergency situation establishes a channel to the base station 100. After the establishment, the mobile station 200*a* which sent the communication for emergency situation performs communication according to the normal communication procedure.

17 Claims, 8 Drawing Sheets

U.S. PATENT DOCUMENTS

| | | | |
|---|---|---|---|
| 4,513,413 A | | 4/1985 | Gorman et al. |
| 4,901,307 A | | 2/1990 | Gilhousen et al. |
| 5,654,979 A | | 8/1997 | Levin et al. |
| 5,678,188 A | | 10/1997 | Hisamura |
| 5,742,666 A | * | 4/1998 | Alpert .................... 455/404.2 |
| 5,926,133 A | | 7/1999 | Green, Jr. |
| 5,930,684 A | | 7/1999 | Keskitalo et al. |
| 6,078,572 A | | 6/2000 | Tanno et al. |
| 6,128,512 A | * | 10/2000 | Trompower et al. ......... 455/561 |
| 6,298,050 B1 | | 10/2001 | van Heeswyk et al. |
| 6,421,009 B2 | * | 7/2002 | Suprunov .................. 342/465 |
| 6,826,394 B1 | | 11/2004 | Raith et al. |
| 7,065,383 B1 | * | 6/2006 | Hovers et al. ........... 455/562.1 |
| 2001/0026542 A1 | | 10/2001 | Kusaka et al. |
| 2001/0050926 A1 | | 12/2001 | Kumar |
| 2003/0003901 A1 | * | 1/2003 | Kuroiwa .................... 455/419 |
| 2003/0073424 A1 | | 4/2003 | Nunally |
| 2003/0161411 A1 | | 8/2003 | McCorkle et al. |

FOREIGN PATENT DOCUMENTS

| | | |
|---|---|---|
| JP | 63-108827 A | 5/1988 |
| JP | 2-9238 A | 1/1990 |
| JP | 8-289367 A | 11/1996 |
| JP | 9-233051 A | 9/1997 |
| JP | 2000-59845 A | 2/2000 |
| JP | 2001-143182 A | 5/2001 |
| JP | 2002-502143 A | 1/2002 |
| WO | WO-91/07037 A1 | 5/1991 |
| WO | WO-92/21196 A1 | 11/1992 |
| WO | WO-94/19876 A1 | 9/1994 |
| WO | WO-99/38270 A2 | 7/1999 |
| WO | WO-00/36763 A1 | 6/2000 |

OTHER PUBLICATIONS

JP-0828936MT (JP 0828936 -translation) Suzuki Takao, Nov. 1, 1996.*

Kohji Takeo, "A Study of CDMA Macro/Micro Cellular System," The Institute of Electronics, Information and Communication Engineers, Sogo Taikai Koen Ronbunshu Tsushin 1, Mar. 11, 1996, p. 397.

N Kanada et al, "4 Efficient Emergency Communication Method using CDMA Systems," Research Meeting of Electronic Navigation Research Institute (Third Time, Jun. 2003), Jun. 5, 2003, pp. 15-18.

N Kanada et al, "Efficient Emergency Communication Method using CDMA Systems," Japan Radio Air Navigation Systems Association, 2003 Autumn Issue No. 37, Sep. 10, 2003, pp. 51-57.

N Kanada et al., "Efficient Preemption Method on CDMA Systems," The 3rd NexSAT Steering Group, Oct. 30, 2003.

* cited by examiner

< NORMAL COMMUNICATION >

< IN THE CASE OF MOBILE STATION 200a
SENDING EMERGENCY COMMUNICATION >

<VORONOI DIAGRAM WHERE P0, ..., P5 ARE GENERATRICES>

<SENDING PROCEDURE OF EMERGENCY
COMMUNICATION etc. BY INTERFERENCE>

MOBILE STATION AND METHOD FOR CONTROLLING MOBILE STATION SIDE COMMUNICATION, BASE STATION AND METHOD FOR CONTROLLING BASE STATION SIDE COMMUNICATION, AND COMMUNICATION SYSTEM

TECHNICAL FIELD

The present invention relates to a communication control method and a communication system of a base station and a mobile station in a communication system. More specifically, it relates to a communication control method in CDMA communication system which is suitable for communication for emergency situation when compared with normal communication, and to a communication system including a base station and mobile stations.

BACKGROUND ART

The near-far problem is always a problem in CDMA (Code Division Multiple Access) system. If mobile stations transmit at the same power, the radio wave from mobile stations far from a base station is weak at the base station and the radio wave from mobile stations near the base station is strong at the base station, which causes the problem. This has not been a problem in the Frequency Division Multiple Access (hereafter described as FDMA) and the Time Division Multiple Access (hereafter described as TDMA) being conventional multiplexing communication systems.

In FDMA, each mobile station uses a different frequency. Therefore, even if strength of the radio wave from a far mobile station and strength of the radio wave from a close mobile station are different, the base station can distinguish them according to frequencies.

In TDMA, each mobile station uses a different time slot. Therefore, the radio wave from a far mobile station and the radio wave from a close mobile station do not simultaneously come to the base station. Accordingly, even if strength of the radio wave from the distant mobile station and strength of the radio wave from the close mobile station are different, the base station can distinguish them according to time slots.

On the other hand, in CDMA system, the base station simultaneously communicates with a plurality of mobile stations using the same frequency and different codes. Then, if the radio wave from a distant mobile station and the radio wave from a close mobile station come simultaneously at the same frequency, the radio wave from the distant mobile station will be drowned out by the radio wave of the close mobile station. This is an outline of the problem called the near-far problem.

To avoid the near-far problem, the following two methods are currently known. One is the method of using an artificial satellite as a base station and stations on the earth (the airspace also included) as mobile stations. In this case, as to all the mobile stations, the ratio of the distance between the mobile station and the base station is approximately constant. Therefore, even when CDMA system is used for communication, the near-far problem does not occur. This method is used in GPS (Global Positioning System).

The other is the method in which mobile stations control their power by performing communication between the mobile stations and the base station and configuring feedback loops so that the field strength from each mobile station at the base station may become approximately constant. This is called power control. As to the power control, there are two type methods; open loop control and closed loop control. These methods are used by a cellular system such as a cellular phone, and are patents of Qualcomm Incorporated (in USA) (for example, refer to the Patent Document 1, the Patent Document 2, and the Patent Document 3).

Patent Document 1: International Publication WO 91/07037
Patent Document 2: International Publication WO 92/21196
Patent Document 3: International Publication WO 94/19876

DISCLOSURE OF THE INVENTION

Problems to be Solved by the Invention

Conventionally, emergency communication etc. has been performed as follows: The emergency communication etc. herein indicates one of distress communication, emergency communication, safety communication, and extraordinary communication defined by the Radio Law.

In FDMA, specific frequencies are defined to be emergency communication frequencies, and one is obliged to always monitor the emergency communication frequencies (Article 65 of the Radio Law). However, according to this method, it is prohibited to use the emergency communication frequency when emergency communication etc. is not performed. That is, it is impossible to affirm that all the frequencies are being utilized for communication.

Similarly, in TDMA, specific time slots are defined to be time slots for emergency and it is not allowed to use the time slots for emergency except in an emergency. Thus, it is possible to perform emergency communication etc. However, according to this method, it is prohibited to use the time slots for emergency when emergency communication etc. is not performed. That is, it is impossible to affirm that all the time is utilized for communication.

Similarly, in the case of CDMA, specific codes are defined to be codes for emergency and it is not allowed to use the codes for emergency except in an emergency. Thus, it is possible to perform emergency communication etc. However, according to this method, it is prohibited to use the code for emergency when emergency communication etc. is not performed. That is, it is impossible to affirm that all the codes are utilized for communication.

As stated above, the problem common to the conventional methods is that an emergency communication frequency in the case of FDMA, a time slot for emergency in the case of TDMA, and a code for emergency in the case of CDMA are reserved for emergency communication. In other words, a part of channel capacity that is assigned as a radio wave, which is limited resource, is always reserved for emergency communication etc. seldom used. Such emergency communication is hereafter called the emergency communication of the channel capacity reservation type.

In the emergency communication of the channel capacity reservation type, partial channel capacity is reserved only for the time of performing emergency communication etc. rarely performed. Therefore, it is impossible to utilize all the channel capacity for normal communication, which is inefficient in the respect of effective use of a radio wave, which is limited resource.

Furthermore, in the case of FDMA, it is necessary to always monitor the emergency communication frequency on which a call rarely exists, as different one from normal communication. This gives a large burden to a person who operates it.

The present invention aims at preferentially dealing with communication for emergency situation by a simple and effective method when emergency communication etc. is sent. A method of preferentially dealing with communication for emergency situation by a simple and effective method, especially in the case of using CDMA system for communication, is proposed.

Means to Solve the Problems

According to a mobile station of the present invention, the mobile station which communicates with a base station includes:

an emergency communication call part to request to initiate a call of communication for emergency situation, in time of emergency;

an output control part, in response to a request from the emergency communication call part, to control field strength of a signal to be used for the communication for emergency situation so that the communication for emergency situation will be established at the field strength, with submerging communication between other mobile stations and the base station; and a mobile station side transmission part to transmit a call signal of the communication for emergency situation to the base station, at the field strength controlled by the output control part.

Moreover, the output control part increases the field strength of the call signal until the field strength becomes strong enough for a signal to be decoded, the signal being received by the base station from the mobile station in case of the communication for emergency situation, with submerging a signal received by the base station from the mobile station in case of normal communication.

Moreover, the output control part continues to retain the field strength to be strong enough to establish the communication for emergency situation with submerging the communication between the other mobile stations and the base station until the communication for emergency situation with the base station is completed.

Moreover, the mobile station side transmission part transmits identification information indicating to be the communication for emergency situation, together with the call signal of the communication for emergency situation, at emergency field strength controlled by the output control part.

Moreover, after the mobile station side communication part transmits the call signal of the communication for emergency situation, the output control part ignores a suppression signal of the field strength transmitted from the base station until channel for emergency situation to the base station is established in response to the call signal, and after the channel for emergency situation is established, suppresses the field strength to be normal field strength, and after the channel for emergency situation to the base station is established, the mobile station side transmission part performs the communication for emergency situation with the base station at the normal field strength controlled by the output control part.

Moreover, the mobile station side transmission part continues to transmit the call signal of the communication for emergency situation to the base station at emergency field strength controlled by the output control part, until channel for emergency situation to the base station is established.

Moreover, in time of an emergency of an aircraft or a ship, the emergency communication call part requests to initiate a call of distress communication as the call of the communication for emergency situation, and the output control part, in response to the request of the emergency communication call part, controls the field strength used for communication with the base station so that the communication for emergency situation will be established at the field strength, with submerging the communication between the other mobile stations and the base station.

Moreover, the emergency communication call part requests to initiate a call of at least one of emergency communication, safety communication, or extraordinary communication, as the call of the communication for emergency situation, and the output control part, in response to the request of the emergency communication call part, controls the field strength being an antenna power in a range not against laws and used for communication with the base station so that the communication for emergency situation will be established at the field strength, with submerging the communication between the other mobile stations and the base station.

Moreover, according to the mobile station described in claim 1, the emergency communication call part requests to initiate a call of at least one of emergency communication, safety communication, or extraordinary communication, as the call of the communication for emergency situation, and the output control part, in response to the request of the emergency communication call part, controls the field strength and used for communication with the base station by using directivity of an antenna, so that the communication for emergency situation will be established at the field strength, with submerging the communication between the other mobile stations and the base station.

According to a method for controlling mobile station side communication of the present invention, the method for controlling mobile station side communication which communicates with a base station includes:

requesting to initiate a call of communication for emergency situation, in time of emergency;

in response to the requesting to initiate the call of the communication for emergency situation, controlling field strength of a signal to be used for the communication for emergency situation so that the communication for emergency situation will be established at the field strength, with submerging communication between other mobile stations and the base station; and transmitting a call signal of the communication for emergency situation to the base station, at the field strength controlled.

According to a base station of the present invention, the base station which communicates with a plurality of mobile stations includes:

a base station side reception part to receive signals transmitted from the plurality of mobile stations;

a detection part to detect a call signal of communication for emergency situation from the signals received by the base station side reception part, based on field strength of the signals received; and a base station side transmission part to transmit an assignment signal for assigning channel for emergency situation to a mobile station which sent the call signal of the communication for emergency situation detected by the detection part.

Moreover, the base station side transmission part transmits the assignment signal for assigning all or a part of assignable channel to the mobile station which sent the call signal of the communication for emergency situation detected by the detection part.

Moreover, in case of the detection part detecting the call signal of the communication for emergency situation, the base station side transmission part transmits suppression signals of the field strength to the plurality of mobile stations, and transmits the assignment signal to the mobile station with which communication does not stop even by the suppression signals of the field strength transmitted.

Moreover, the base station side transmission part transmits signals directing a reduction of the field strength, a keeping of a present condition of the field strength, or a physical disconnection of normal communication, to mobile stations, as the suppression signals of the field strength.

According to a method for controlling base station side communication of the present invention, the method for controlling base station side communication which communicates with a plurality of mobile stations includes:

receiving signals transmitted from the plurality of mobile stations;

detecting a call signal of communication for emergency situation from the signals received, based on field strength of the signals received; and transmitting an assignment signal for assigning channel for emergency situation to a mobile station which sent the call signal of the communication for emergency situation detected.

According to a communication system of the present invention, the communication system where a base station and a plurality of mobile stations communicate comprises, each mobile station of the plurality of mobile stations including:

an emergency communication call part to request to initiate a call of communication for emergency situation, in time of emergency;

an output control part, in response to a request from the emergency communication call part, to control field strength to be used for the communication for emergency situation so that the communication for emergency situation will be established at the field strength, with submerging communication between other mobile stations and the base station; and a mobile station side transmission part to transmit a call signal of the communication for emergency situation to the base station, at the field strength controlled by the output control part, and the base station including:

a base station side reception part to receive signals transmitted from the plurality of mobile stations;

a detection part to detect a call signal of communication for emergency situation from the signals received by the base station side reception part, based on field strength of the signals received; and a base station side transmission part to transmit an assignment signal for assigning channel for emergency situation to a mobile station which sent the call signal of the communication for emergency situation detected by the detection part.

Moreover, the communication system includes a plurality of base stations, and each base station of the plurality of base stations is located so that a coverage area of the each base station may not overlap and independently performs normal communication and communication for emergency situation with the plurality of mobile stations existing in the coverage area of the each base station.

According to a program for controlling mobile station side communication of the present invention, the program, having computer executable processing, for controlling mobile station side communication, which communicates with a base station, includes:

processing of requesting to initiate a call of communication for emergency situation, in time of emergency;

in response to the requesting to initiate the call of the communication for emergency situation, processing of controlling field strength of a signal to be used for the communication for emergency situation so that the communication for emergency situation will be established at the field strength, with submerging communication between other mobile stations and the base station; and processing of transmitting a call signal of the communication for emergency situation to the base station, at the field strength controlled.

According to a program for controlling base station side communication of the present invention, the program, having computer executable processing, for controlling base station side communication, which communicates with a plurality of mobile stations, includes:

processing of receiving signals transmitted from the plurality of mobile stations;

processing of detecting a call signal of communication for emergency situation from the signals received, based on field strength of the signals received; and processing of transmitting an assignment signal for assigning channel for emergency situation to a mobile station which sent the call signal of the communication for emergency situation detected.

Effects of the Invention

According to the present invention, as it is unnecessary to always reserve a part of channel capacity for emergency communication etc., the channel resource that no longer needs to be reserved can be effectively used.

BEST MODE FOR CARRYING OUT THE INVENTION

In the communication system according to Embodiments explained below, the case of applying the present invention to an aviation field will be described as an example. In this case, a ground station which communicates with aircraft and a satellite station which communicates with aircraft are called base stations, and an aircraft which communicates with a base station is called a mobile station.

Moreover, it is assumed that a channel using CDMA system is established between mobile stations and a base station. The base station corresponds to a controller, the mobile stations correspond to pilots, and others are equivalent to the conventional structure. Further, in the communication system according to Embodiment explained below, it is assumed that CDMA system is used and it is in a state of no near-far problem, namely power control being performed or the base station being a satellite.

In all the Embodiments explained below, communication for emergency situation indicates distress communication, emergency communication, safety communication, and extraordinary communication. The distress communication indicates a method of preceding a distress signal at the time when a ship or an aircraft is in grave and imminent danger. The emergency communication indicates a method of preceding an emergency signal at the time when a ship or an aircraft has a possibility of lapsing into grave and imminent danger or other emergency matter occurs. The safety communication indicates a method of preceding a safety signal for the purpose of preventing grave danger against navigation of a ship or an aircraft. The extraordinary communication indicates radio communication performed for rescuing a human life, relieving at a disaster, reserving transportation and telecommunication, or retaining order when it is impossible or remarkably difficult to utilize wired communication, where an earthquake, a typhoon, a flood, a tidal wave, snow damage, a conflagration, a riot or any other emergencies occurred or anticipated to occur. Normal communication indicates communication other than the communication for emergency situation.

Embodiment 1

Embodiment 1 will be explained hereafter. FIG. 1 illustrates normal communication of a base station 100 and a mobile station 200 structuring the communication system according to Embodiment 1. The state is considered that the base station 100 communicates with n mobile stations (n is a natural number, which is 2 or greater than 2): a mobile station 200a, a mobile station 200b, a mobile station 200c, . . . , and a mobile station 200n. Normally, as shown in FIG. 1, all the mobile stations 200 perform normal communication with the base station 100.

Next, a method of the mobile station 200a's performing communication for emergency situation will be described. FIG. 2 illustrates a communication state when the mobile station 200a sends communication for emergency situation. The mobile station 200a temporarily increases field strength of a signal to be sent to the base station 100 from the mobile station 200a. This can be realized by a method, for example, in which the mobile station 200a temporarily increases output, or changes a gain of an antenna by using an array antenna and such. At this time, it is supposed that the base station 100 continues to output a signal which controls all the mobile stations 200 to maintain the output level having been kept.

According to a feature of CDMA system which is known as the near-far problem, when field strength from only a certain mobile station becomes strong, it becomes impossible for the base station to decode radio waves from the other mobile stations. In the present case, when the radio wave from the mobile station 200a at the base station 100 becomes sufficiently strong compared with radio waves from the other mobile stations, it becomes impossible for the base station 100 to decode radio waves of the mobile station 200b, . . . , the mobile station 200n.

Thus, the mobile station 200a submerges communication between the base station 100 and the other mobile stations 200b, . . . , 200n by increasing the field strength of a call signal until a communication signal between the mobile station 200a and the base station 100 becomes to have the field strength strong enough to be decoded, in order to establish an exclusive channel which can use all the channel capacity for the base station 100. When the mobile station is in the coverage area of the base station, since a radio wave from the base station reaches the mobile station, output control at the base station side is unnecessary.

Next, an internal structure of the base station 100 and the mobile station 200 which compose the communication system of the present Embodiment will be explained with reference to FIG. 3.

The mobile station 200 utilizing CDMA needs an output control part 202 which has a function of normal power control, i.e., controlling field strength of a signal for performing normal communication, and a function of temporarily increasing an output, with ignoring the normal power control, by switching from the normal function to the emergency one. In addition, the mobile station 200 includes a communication control part 204 which controls normal communication, an emergency communication call part 206 which requests the output control part 202 to initiate a call of communication for emergency situation in time of emergency, a mobile station side transmission part 208 which transmits a signal for radio communication with the base station 100, and a mobile station side reception part 210 which receives a signal for radio communication with the base station 100.

On the other hand, the base station 100 includes an output control part 102 which controls field strength of a signal used for radio communication with the mobile station 200, a base station side transmission part 110 which transmits a signal for radio communication with the mobile station 200, a base station side reception part 108 which receives a signal for radio communication with the mobile station 200, a detection part 106 which detects a call signal of communication for emergency situation from the received signal based on the field strength of the signal received by the base station side reception part 108, and a communication control part 104 which controls normal communication.

Next, operations of the present communication system will be explained. The mobile station 200a sends communication for emergency situation to the base station 100 as follows:

(1) Corresponding to a call request of communication for emergency situation sent from the emergency communication call part 206 in an emergency, the output control part 202 switches the output adjustment of field strength from the normal mode to the emergency mode, submerges communication between the other mobile stations and the base station 100, and increases the field strength used for the communication for emergency situation until the field strength of the communication signal in an emergency between the mobile station concerned and the base station 100 becomes strong enough to be decoded.

(2) The mobile station side transmission part 208 sends a call signal of the communication for emergency situation to the base station 100, at the field strength controlled by the output control part 202.

(3) The base station side reception part 108 receives a strong radio wave from the mobile station 200a which sent the communication for emergency situation.

(4) The detection part 106 detects the call signal of the communication for emergency situation in the received signal, based on the field strength of the signal received by the base station side reception part 108, and the base station side transmission part 110 continues to output suppression signals to all the mobile stations for suppressing their field strength. At this time, the base station side transmission part 110 sends signals to all the mobile stations, as the suppression signals of the field strength, which direct reduction of the field strength, keeping of the present condition of the field strength (determent of the rise of the field strength), or physical disconnection of the normal communication with the other mobile stations.

(5) The mobile station 200a ignores this suppression signal for the field strength, and since the other mobile stations are suppressed by the near-far effect, it becomes impossible for the base station 100 to receive communication except for the communication for emergency situation sent from the mobile station 200a.

(6) The base station side transmission part 110 transmits an assignment signal for assigning channel for emergency situation to the mobile station 200a which sent the communication for emergency situation detected by the detection part 106, and only the mobile station 200a which sent the communication for emergency situation establishes a channel to the base station 100. The base station side transmission part 110 can assign all or a part of assignable channel to the mobile station 200a. When the base station side transmission part 110 assigns all of the assignable channel to the mobile station 200a, the mobile station 200a can quickly perform the communication for emergency situation by using all of the channel. When the base station side transmission part 110 assigns a part of the channel to the mobile station 200a, the communication for emergency situation with the mobile station 200a can be reserved while retaining the normal communication of the other mobile stations using the channel to the base station 100.

(7) After establishing the channel for emergency situation to the base station 100, the output control part 202 of the mobile station 200a suppresses the field strength to be normal field strength, and performs the communication for emergency situation with the base station according to the normal communication procedure. However, it is also acceptable for the output control part 202 to continue to retain the field strength strong enough to establish the communication for emergency situation, with submerging the communication between the other mobile stations and the base station 100, until the communication for emergency situation with the base station 100 is completed.

Next, in addition to the above communication procedure, the case of requesting a code allocation with initiating a call of communication for emergency situation will be explained with reference to FIG. 4. FIG. 4 shows a communication procedure under the assumption of the case of the mobile station 200a sending communication for emergency situation. The bold lines in FIG. 4 indicate that transmission is performed in an emergency by using a stronger output (field strength) than a normal one.

First, corresponding to a call request of communication for emergency situation sent from the emergency communication call part 206 in an emergency, the output control part 202 switches the output adjustment of field strength from the normal mode to the emergency mode, submerges communication between the other mobile stations and the base station 100, and increases the field strength used for the communication for emergency situation until the field strength of the communication signal in an emergency between the mobile station concerned and the base station 100 becomes strong enough to be decoded (S1).

The mobile station side transmission part 208 transmits a code allocation request signal together with the call signal of the communication for emergency situation, at the field strength controlled by the output control part 202 (S2). The code allocation request signal is an example of identification information indicating to be communication for emergency situation. Therefore, as long as the code allocation request signal can inform the base station 100 that it is in an emergency, it may have any information.

The base station side reception part 108 receives a strong radio wave from the mobile station 200a which sent the communication for emergency situation (S3).

The detection part 106 detects the call signal of the communication for emergency situation in the received signal, based on the field strength of the signal received by the base station side reception part 108, and the base station side transmission part 110 continues to output suppression signals for suppressing field strength to the other mobile stations (S4).

As the other mobile stations are suppressed by the near-far effect, it becomes impossible for the base station 100 to receive communication except for the communication for emergency situation sent from the mobile station 200a (S5).

The base station side transmission part 110 transmits an assignment signal (code allocation) for assigning channel for emergency situation to the mobile station 200a which sent the communication for emergency situation detected by the detection part 106, and only the mobile station 200a which sent the communication for emergency situation establishes a channel to the base station 100 (S6).

The mobile station side transmission part 208 transmits an acknowledgement signal (Ack) over the code allocation, to the base station 100 (S7).

Then, it returns to the normal power-controlled state (field strength in normal time), which can minimize the interference to the communication of the other mobile stations. Moreover, by this method, it is possible to prepare for the case of other mobile station's sending communication for emergency situation. In this system, the communication is finally performed according to the normal communication procedure (S8). That is, the field strength of the mobile station 200a, which sent the communication for emergency situation, finally becomes the same as the one power-controlled by the normal communication.

For this purpose, when a channel is established, a negotiation will be performed between the mobile station 200a and the base station 100, and the mobile station 200a will reserve only a necessary band (code) to perform communication for emergency situation. However, as mentioned above, it is also acceptable for the mobile station 200a to reserve all the bands (codes) for the communication for emergency situation.

In the case of an aircraft or a ship sending distress communication, the antenna power does not necessarily need to be in the range described in the radio station license. When a ship or an aircraft performs distress communication, the installation place of radio equipment, the identification code, the type of a radio wave, a frequency, operation time, and an antenna power do not need to comply with what is described in the license. That is, it is possible to perform transmission at the maximum output technically possible which exceeds the output permitted by the license. Even if the transmission is performed at the technically possible maximum output, the Radio Law (Articles 52, 53, 54, 55, 56, 66, 67, 68, 80, and 106) is not infringed.

Therefore, in the case of an emergency of an aircraft or a ship, when the emergency communication call part 206 requests a call of distress communication as a call of communication for emergency situation, the output control part 202 performs transmission, corresponding to the request of the emergency communication call part 206, at a sufficiently large output (depending upon a receiver and a modulation system to be used, and a required error occurrence rate) of the field strength used for communication with the base station 100. Accordingly, it becomes possible to suppress radio waves from the other mobile stations (which perform transmission at the antenna power described in the radio station license). That is, the output control part 202 can perform transmission with setting the field strength output to the maximum of self-capacity.

However, this method intentionally blocks operations of other radio stations. Therefore, when the emergency communication call part 206 requests a call of at least one of emergency communication, safety communication, or extraordinary communication, as a call of communication for emergency situation, the output control part 202 needs to control the field strength used for communication with the base station 100 as follows, corresponding to the request of the emergency communication call part 206. That is, the output control part 202 needs to control the field strength used for communication with the base station 100 to be antenna power in the range not against laws, such as the Radio Law, and field strength of establishing the communication for emergency situation with submerging communication between other mobile stations and the base station. In the case of performing communication at excessive antenna power for uses other than distress communication in Japan, it is punished under Article 56 of the Radio Law.

The radio communication method and its communication system which performs distress communication, emergency communication, safety communication, extraordinary communication (communication for emergency situation), normal communication and so on, by using a code division multiple access (CDMA) system has been explained above. Features of the radio communication method and its communication system are as follows: being composed of the base station 100 and two or more mobile stations 200 for performing radio communication, including a transceiver which enables to communicate at field strength larger than that of the other mobile stations performing normal communication in the case of the base station 100 and the mobile stations 200 performing communication other than the normal communication, and giving priority to the communication with the mobile station performing communication for emergency situation by submerging communication of the mobile station 200 which performs normal communication with the base station 100 in radio waves of emergency communication etc.

Moreover, has been explained the radio communication method and its system which includes the first step in which the mobile station 200 measures the field strength from the base station 100 and calculates proper transmission power corresponding to a distance from the base station 100 at the normal communication, includes the means at a strong level exceeding the transmission power calculated in the first step, and includes the means in the mobile station side to control communication at transmission power larger than the transmission level at the normal communication.

According to the invention of the present Embodiment, firstly, it is unnecessary to always reserve a part of channel capacity for emergency communication etc., which is unlike the emergency communication of the channel capacity reservation type. This greatly contributes to effective use of frequency being a global subject.

Moreover, as to the channel exclusively established by this method, the whole capacity of the channel can be exclusively used by one station. Explaining more precisely, since the mobile station that sends emergency communication etc. can freely select a code, the mobile station can arbitrarily set up a channel capacity. Such feature that the channel capacity can be arbitrarily set up is peculiar to the CDMA system, and large-scale equipment is needed for realizing the same system in the TDMA system or the FDMA system.

Furthermore, the base station is released from the duty of listening to emergency communication frequency, which is an indispensable duty in FDMA.

Embodiment 2

In the present Embodiment, the situation that communication for emergency situation may be called from two or more mobile stations 200 will be considered. FIG. 5 shows a whole structure of a communication system where a plurality of mobile stations initiate calls of communication for emergency situation.

For the communication for emergency situation sent from the first mobile station 200*a*, a channel is established like the above stated. For the communication for emergency situation sent from the second mobile station 200*n*, the following procedures are added according to the present Embodiment.

In the case the mobile station 200*n* fails in reserving an exclusive channel to the base station 100*a*, it tries to reserve an exclusive channel to the base station 100*a* at a certain time interval (time interval is determined at random) as an example stated above until it reserves it.

At the time of the first mobile station 200*a* reserving a channel and performing a negotiation (establishment of channel for emergency situation), the first mobile station 200*a* reduces the output (field strength).

The mobile station side transmission part 208 of the second mobile station 200*n* continues to transmit a call signal of communication for emergency situation to the base station 100 at the field strength controlled by the output control part 202 until channel for emergency situation to the base station 100*a* is established. Therefore, after the first mobile station 200*a* reduces the field strength, the mobile station side transmission part 208 of the second mobile station 200*n* can reserve the channel to the base station 100*a*. At this time, it should be noticed that distribution of the channel capacity (in the case of CDMA, determination of a code) may be concerned by the base station.

In addition, it is also possible for the base station 100*a* to accept the emergency call signal from the second mobile station 200*n*, sent during the communication for emergency situation between the first mobile station 200*a* and the base station 100*a*, while the first mobile station 200*a* and the base station 100 perform communication for emergency situation. In this case, since the time period in which the communication for emergency situation with the first mobile station 200*a* is broken by the emergency call signal from the second mobile station 200*n* is at most about 100 milliseconds, it does not cause a large trouble to the communication between the first mobile station 200*a* and the base station.

Thus, it becomes possible for the base station 100*a* to perform communication for emergency situation with the first mobile station 200*a* and communication for emergency situation with the second mobile station 200*n* in parallel, by accepting the emergency call signal of the second mobile station 200*n* during the communication with the first mobile station 200*a*.

Moreover, in the cellular system, if coverage areas of base stations are divided not to overlap, the problem in the case of many base stations existing can be reduced to the case of only one base station. In this case, the shape of a cell can be other than Voronoi Division being the optimal shape.

Voronoi Division is a division composed of line segments of perpendicular bisectors for adjacent $P_i$ and $P_j$'s, for $\{P_i\}$ being a set of $P_i$, where i is a natural number and $P_i$ is a point indicating the base station 100 in this case. The polygon made by this division is called a Voronoi polygon and the diagram showing the whole division is called a Voronoi diagram. FIG. 6 shows an example of the Voronoi diagram where $P_0, \ldots, P_5$ are generatrices.

In the cellular system, as mentioned above, the method for communication for emergency situation described in each Embodiment for the mobile station 200*a* and the mobile station 200*b* which communicate with the base station $P_0$ can be established in connection with a base station $P_4$ even when the mobile station 200*a* and the mobile station 200*b* move to the base station $P_4$ as shown in FIG. 6. That is, the communication for emergency situation between the base station $P_0$ and a mobile station in the cell of the base station $P_0$ and the communication for emergency situation between the base station $P_4$ and a mobile station in the cell of the base station $P_4$ are independent of each other.

Therefore, the method in which the base station 100*a* establishes channel for emergency situation shown in FIG. 5 can also be established by the base station 100*b* in the same way. The base station 100*a* and the base station 100*b* are controlled by a central control system 400.

As stated above, have been explained in the present Embodiment the radio communication method and its system which include means to transmit a request code (code allocation request) from the mobile station 200 in an emergency, not the time of normal communication, with initiating a call of communication for emergency situation, to transmit a power control bit (suppression signal of field strength) from the base station 100 by inserting the power control bit into the communication channel, and to control transmission power of other mobile stations.

Moreover, have been explained the radio communication method and its system which include means to control transmission power of normal communication and emergency communication etc., with the mobile station 200's checking establishment or failure of an emergency channel etc., and enable a plurality of mobile stations in the same base station to perform emergency communication by initiating a call of emergency communication etc. at a certain fixed interval until the emergency channel etc. is established.

According to the present Embodiment, since a flag (request code) indicating to be an emergency is transmitted to the base station 100 with a call of communication for emergency situation, the base station 100 can clearly recognize a request of communication for emergency situation.

Moreover, according to the present Embodiment, in the case of the radio network made by the cellular system, since the influence of emergency communication etc. is not exerted on the cell which is far from the station performing emergency communication etc., it is possible to greatly contribute to effective use of frequency.

Embodiment 3

In the above Embodiments, the method in which the mobile station 200a performs communication for emergency situation with the base station 100 by displacing the communication with other mobile stations by temporarily increasing the output has been described. In the present Embodiment, this method is applied to the calling of normal communication. The core of the idea is to make the output of the mobile station performing normal communication lower than the conventional one, not to make the output of the mobile station 200 performing the communication for emergency situation larger than the conventional one.

The case that two or more mobile stations 200 exist in the coverage area of one base station 100 will be considered. As mentioned above, it can be thought that even if the number of the base stations increases, it is reduced to the case of one base station because the space can be divided into coverage areas (cellular system). That is, one base station system can be assumed without loss of generality.

The size of a coverage area covered by one base station 100 is set to be smaller than that of the normal system. Then, in performing communication between the base station 100 and the mobile station 200, it is enough to transmit at power (field strength) smaller than that of the normal system. Concretely, normal communication is performed with recognizing 1/n (n is a ratio of power required for performing suppression using the near-far problem) of the maximum power of the mobile station side used in the normal system, as the maximum power allowed for the mobile station.

When the mobile station 200 establishes communication with the base station 100, transmission is performed at the maximum power equivalent to that of the normal system. At this time, it is assumed that the base station 100 continues to output suppression signals to all the mobile stations 200 for suppressing their outputs.

By doing this, an exclusive channel to the base station 100 can be established, with temporarily suppressing communication of the other mobile stations like a previous example. Such establishment of an exclusive channel is utilized for initiating a call to the base station from the mobile station 200.

When performing this call, though the channel temporarily becomes suspended, after the mobile station having performed the call returns to a normal output (normal field strength), the other mobile stations can return to the normal communication. If this communication is data communication of a packet system, even when the communication temporarily becomes suspended, the communication can be performed like that of before the call, after the channel has recovered. Then, the temporal suspension of the communication does not become a large problem.

Moreover, although a short-time (normally about 100 milliseconds) disconnection occurs in the communication with a circuit switching system, such as a telephone, if the disconnection time is small, one would not be greatly annoyed while on the telephone and can practically use it without any problem.

According to the present Embodiment, a call can be performed by the above-mentioned procedure without using a control channel. The control channel is a special channel which is not used for communication. Since communication can be performed without using the control channel (a power control signal can be superimposed on normal communication), it is possible to use all the assigned frequencies for the communication. Therefore, the band (channel capacity) having been used as a control channel can be used for normal communication. Consequently, it can greatly contribute to the effective use of the frequency.

Moreover, according to the present Embodiment, because the field strength of the mobile station performing normal communication is made to be lower than the conventional one, not because the field strength of the mobile station 200 performing communication for emergency situation is made to be larger than the conventional one, the amount of power required for the whole communication system can be reduced.

Embodiment 4

In the present Embodiment, will be explained the communication method in which a mobile station to send a signal of communication for emergency situation firstly sends a noise in order to interfere with the normal communication between other mobile stations and the base station, and then stops a noise to send information on the communication for emergency situation.

The case that two or more mobile stations 200 exist in the coverage area of one base station 100 will be considered. As mentioned above, it can be thought that even if the number of the base stations 100 increases, it is reduced to the case of one base station because the space can be divided into coverage areas (cellular system). That is, also in the present Embodiment, one base station system can be assumed without loss of generality.

It is assumed that the base station 100 communicates with n mobile stations (n is a natural number, which is 2 or greater than 2): a mobile station 200a, a mobile station 200b, ..., and a mobile station 200c. Normally, as shown in FIG. 1, all the mobile stations 200 perform normal communication with the base station. A method of the mobile station 200a's performing communication for emergency situation in this case will be explained with reference to FIG. 7.

FIG. 7 shows a sending procedure of the communication for emergency situation by interfering according to the present Embodiment. First, at the mobile station 200a side, corresponding to a call request of the communication for emergency situation sent from the emergency communication call part 206, the following is performed in an emergency: the output control part 202 switches the output adjustment of field strength from the normal mode to the emergency mode, and controls the field strength used for the communication for emergency situation to be strong enough to interfere with communication between the other mobile stations and the base station 100 (S1), and the mobile station side transmission part 208, by outputting a signal at strong field strength, interferes with communication from the other mobile stations (in FIG. 1, the mobile station 200b, . . . , the mobile station 200n) to the base station 100 (S12). It is based on the characteristic of the CDMA system that it is easy to interfere with communication with other mobile stations. This interference does not need to include the contents of communication (a flag indicating to be communication for emergency situation) which is included in Embodiment 2, and it is acceptable for the interference to be a noise indicating arbitrary contents or indicating nothing. The noise needs to be transmitted at the field strength strong enough to interfere with communication between the base station 100 and the other mobile stations.

In the case of transmitting a sign indicating communication for emergency situation or terminal information of the mobile station 200a, as a flag indicating to be communication for emergency situation, which should be included in the communication system according to Embodiment 2, not in the similar type of the present Embodiment.

In response to the above noise, the base station 100 transmits suppression signals of field strength to all the mobile stations for instructing to reduce outputs (field strength) (S13).

According to the output reduction instruction, mobile stations other than the mobile station 200a reduce field strength in response to the suppression signals, so that signals from the other mobile stations stop reaching the base station 100 and the communication stops (S14).

In the meantime, the mobile station 200a ignores the suppression signals of field strength from the base station 100, and transmits not an interference wave (noise), but the contents of the communication for emergency situation to the base station 100 at the maximum output permitted in an emergency (S15). It is assumed that the base station continues to output the output reduction instructions.

By detecting that links with the other mobile stations are disconnected, the base station 100 recognizes that the request of communication for emergency situation is sent from the mobile station 200a (S14, S15).

Moreover, according to the power control patents of Qualcomm, since the time constant of output rise is longer than the time constant of output reduction, the mobile station 200a can obtain an output relatively larger than the other mobile stations until the other mobile stations return outputs to the original ones. Therefore, even if the base station 100 does not send output reduction instructions, the base station 100 can recognize that the request of communication for emergency situation is sent from the mobile station 200a.

After this, the channel is established like Embodiment 1, and the communication for emergency situation is performed based on the normal communication procedure.

According to the present Embodiment, the mobile station 200a requesting the communication for emergency situation can inform the base station 100 that the mobile station 200a is requesting to establish channel for emergency situation, by outputting only the noise to interfere with normal communication between other mobile stations and the base station 100, without including the contents notifying the emergency in the signal.

The communication systems according to all the Embodiments stated above can also be realized by the internal structure of the base station 100 and the mobile station 200 as shown in FIG. 8.

In the communication system shown in FIG. 8, compared with the mobile station 200 of FIG. 3, the output control part 202 and the emergency communication call part 206 do not exist in the mobile station 200, and instead of them, an emergency communication management part 300 is needed between the mobile station 200 and the base station 100.

The emergency communication management part 300 includes an emergency communication call part 302 and an amplifier 304. In time of emergency, the emergency communication call part 302 requests to initiate a call of communication for emergency situation, and has the same function as the emergency communication call part 206 in the internal structure of the mobile station 200 of FIG. 3. In response to the call request of the communication for emergency situation sent from the emergency communication call part 302, the amplifier 304 amplifies the power of the signal (the call signal of communication for emergency situation) transmitted from the mobile station side transmission part 208 to be field strength strong enough to interfere with communication between other mobile stations and the base station 100.

The base station side reception part 108 receives the call signal of communication for emergency situation amplified by the emergency communication management part 300. Subsequent operations are the same as those in Embodiment mentioned above. Compared with the base station 100 shown in FIG. 3, the output control part 102 is unnecessary for the base station 100 shown in FIG. 8.

The internal structure of the mobile station 200 can be simplified by structuring the communication system as shown in FIG. 8. Since users' requirements of reduction in weight and downsizing of volume for the mobile station 200 are high, such users' requirements can be satisfied with the communication system illustrated in FIG. 8.

In all the Embodiments described above, explanations are provided with reference to CDMA as an example. Since a plurality of mobile stations use the same frequency simultaneously in CDMA, it is possible to submerge all communication of other mobile stations by the near-far problem, and since the near-far problem occurs easily in CDMA, CDMA is a communication method especially suitable for the invention described in the Embodiments. However, the present invention is not limited to CDMA, and is applicable to any communication method as long as the near-far problem occurs in the communication method. While there are several methods in CDMA, it is preferable for the present invention to use the direct spread system used by many systems.

Moreover, according to the communication system of all the Embodiments, even if a method in which, in order to cope with the near-far problem, communication is performed between mobile stations and a base station, feedback loops are configured so that the field strength of each mobile station at the base station may become approximately constant, and outputs are adjusted at the mobile station sides (power control system) is adopted, the present invention can be utilized. Also, even if a system using the power control system or a method of using an artificial satellite as a base station and stations on the earth (the airspace also being included) as mobile stations is adopted, the present invention can be utilized.

Moreover, in all the Embodiments, the field strength which is output by the mobile station 200 and is strong enough to interfere with communication between the other mobile stations and the base station 100 in an emergency may be about one hundred times the field strength used for normal communication. Specifically, it may be about 20 dB. In the case of distress communication, the field strength used for the communication for emergency situation is assumed to be about 10 KW, whereas the field strength used for normal communication by the mobile station 200 is about 100W.

In the communication systems according to all the Embodiments mentioned above, the following can be considered as an example of the method of the mobile station 200's initiating a call of communication for emergency situation: an emergency button is provided in the interface of the mobile station 200, a function to transmit a signal storing data indicating an emergency is linked to the emergency button, and the communication for emergency situation is called by a user's pushing the emergency button.

The communication systems according to all the Embodiments can be realized with a small revision of the communication system conventionally used. Therefore, when applying the communication system according to the present invention to communication using CDMA system, it is possible to preferentially deal with communication for emergency situation using a comparatively simple protocol. Although the communication control method according to the present invention is simple, the following can be realized: easy implementation because of the simplicity, cost reduction, and high reliability in terms of the number of parts being small.

FIG. 9 shows a computer basic structure of the base station 100 and the mobile station 200. In FIG. 9, a CPU 40 which executes programs is connected with a monitor 41, a keyboard 42, a mouse 43, a communication port 44, a magnetic disk drive 46, etc. through a bus 38. An OS 47, a program group 49, and a file group 50 are stored in the magnetic disk drive 46. The form in which the program group 49 and the file group 50 are united to be an object-oriented program group 49 can be considered as one of the Embodiments.

In the case that each part structuring the base station 100 and the mobile station 200 is implemented with a program, the present invention is executed, for instance, by storing a program in which operations to be executed by the output control part 202 are coded and a program in which operations to be executed by the emergency communication call part 206 and so on are coded in the magnetic disk drive 46 as the program group 49, and by executing each program stored in the magnetic disk drive 46 with the CPU 40 and the OS 47.

In each of the above-mentioned Embodiments, the base station 100 and the mobile station 200 use the function of the communication port 44, and radio communication is performed.

In all the Embodiments, each operation of each structure element relates to each other, and taking the relation of the operations stated above into consideration, the operation of each structure element can be replaced as a series of operations. And such replacement enables them to be Embodiments of a method invention.

Moreover, replacement of the operation of each structure element by processing of each structure element enables them to be Embodiments of a program.

Moreover, by storing the program in a computer-readable recording medium in which a program is stored, they can be Embodiments of a computer-readable recording medium stored in a program.

Therefore, the Embodiment of the program for controlling mobile station side communication can be an Embodiment of a computer-readable recording medium storing a program for controlling mobile station side communication, wherein the computer-readable recording medium stores the program, to be executed by a computer, for controlling mobile station side communication, which communicates with a base station, including:

processing of requesting to initiate a call of communication for emergency situation, in time of emergency;

in response to the requesting to initiate the call of the communication for emergency situation, processing of controlling field strength of a signal to be used for the communication for emergency situation so that the communication for emergency situation will be established at the field strength, with submerging communication between other mobile stations and the base station; and processing of transmitting a call signal of the communication for emergency situation to the base station, at the field strength controlled by the output control part.

Therefore, the Embodiment of the program for controlling base station side communication can be an Embodiment of a computer-readable recording medium storing a program for controlling base station side communication, wherein the computer-readable recording medium stores the program, to be executed by a computer, for controlling base station side communication, which communicates with a plurality of mobile stations, including:

processing of receiving signals transmitted from the plurality of mobile stations;

processing of detecting a call signal of communication for emergency situation from the signals received, based on field strength of the signals received; and processing of transmitting an assignment signal for assigning channel for emergency situation to a mobile station which sent the call signal of the communication for emergency situation detected.

Embodiment of a program and Embodiment of a computer-readable recording medium stored in a program can be structured by a program the entirety of which is operable in a computer. Each processing in Embodiment of a program and Embodiment of computer-readable recording medium storing a program can be executed by a program, which is stored in a recording device, loaded from the recording device into a central processing unit (CPU), and executed by the central processing unit.

Moreover, it is also acceptable to realize software and a program of each Embodiment by firmware stored in ROM (READ ONLY MEMORY). Otherwise, it is also acceptable to realize each function of the program mentioned above by a combination of software, firmware, and hardware.

Figure 1:
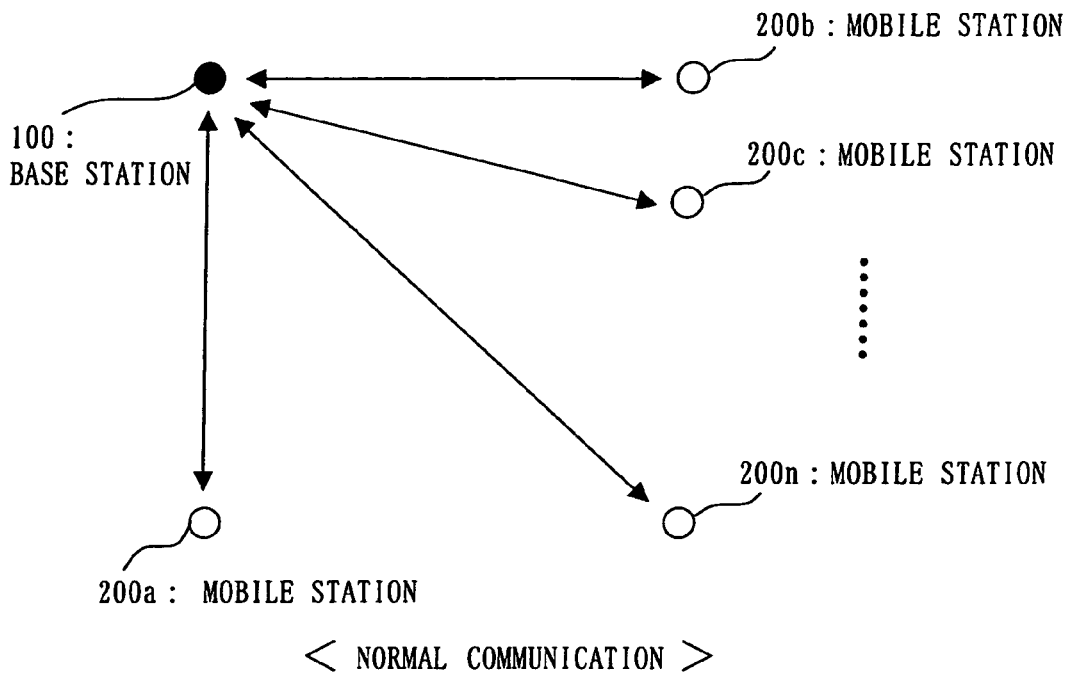
FIG. 1 shows normal communication of a base station and a mobile station.
Figure 2:
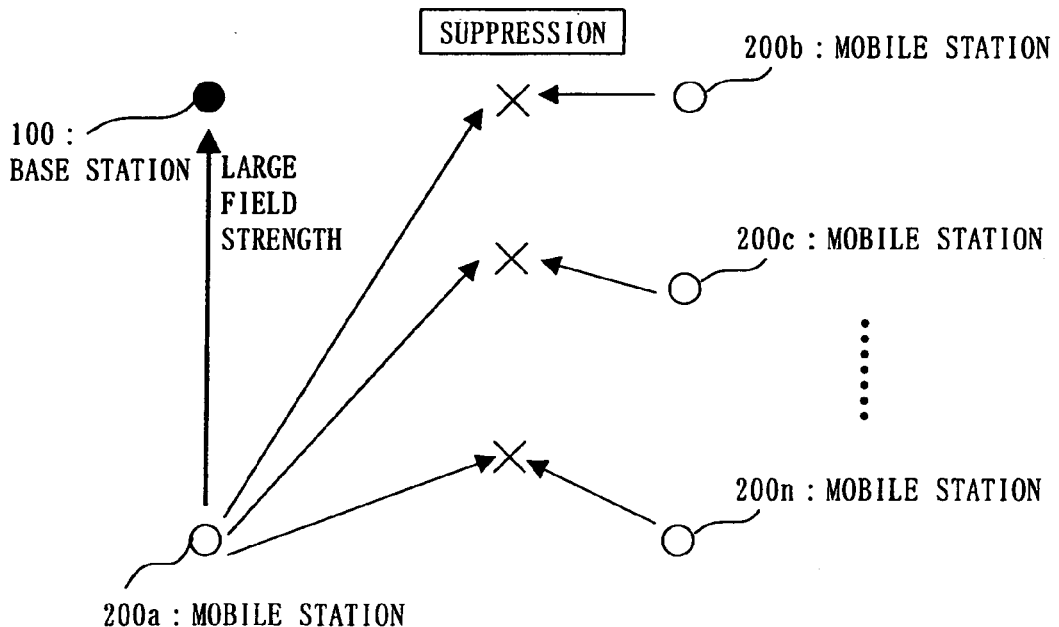
FIG. 2 shows a communication state when a mobile station sends communication for emergency situation.
Figure 3:
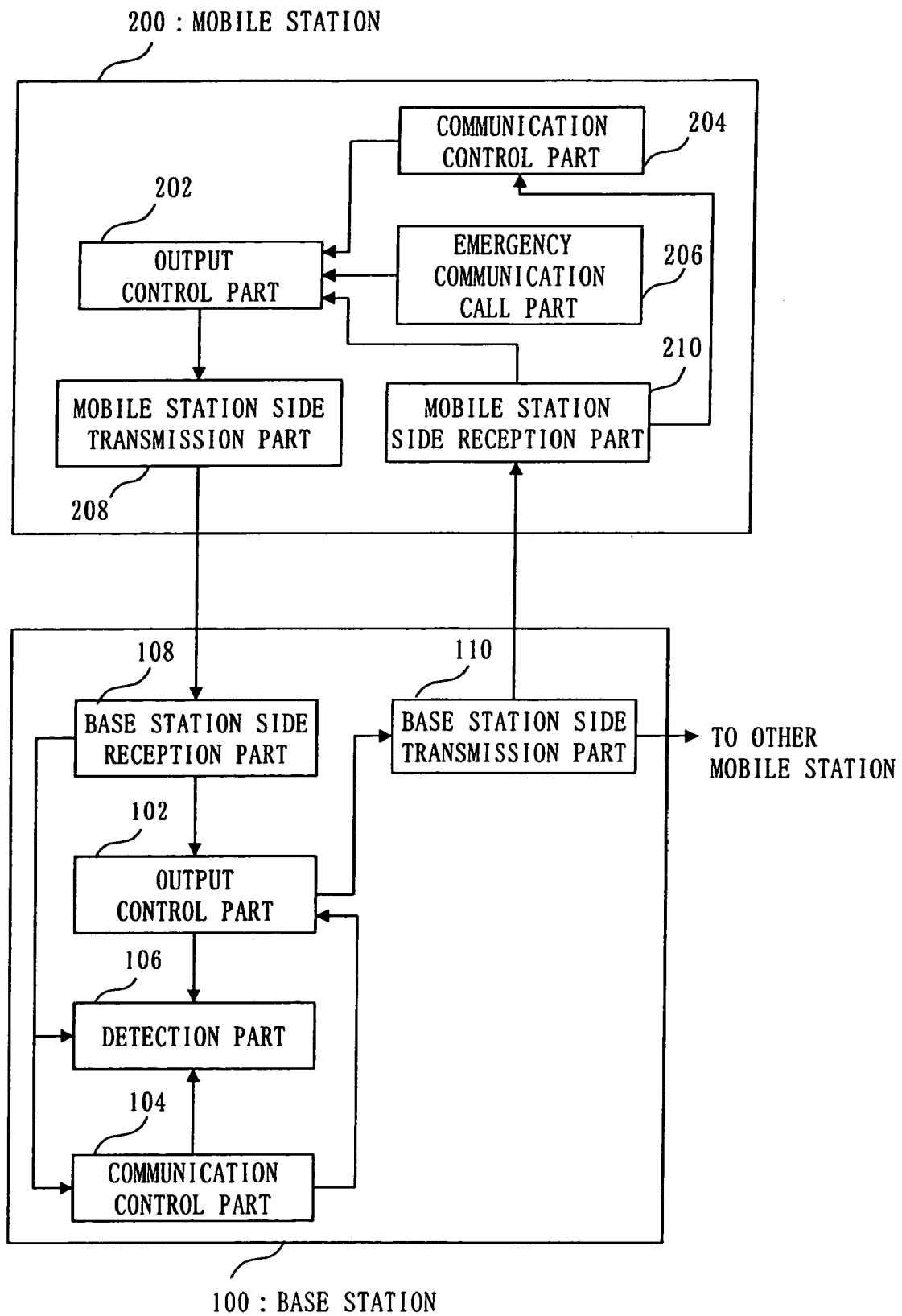
FIG. 3 shows an internal structure of a base station and a mobile station.
Figure 4:
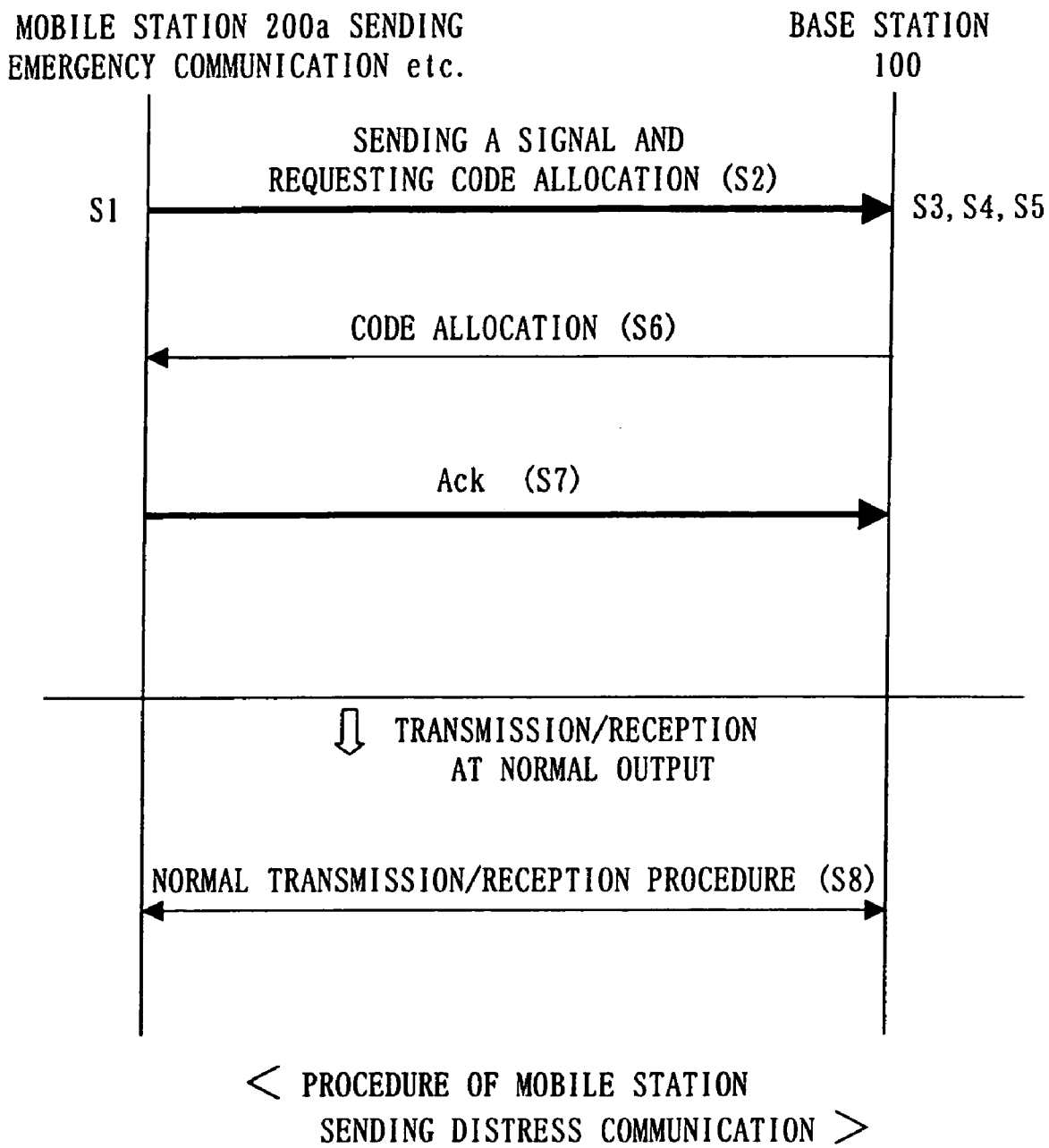
FIG. 4 shows a procedure under the assumption of the case of a mobile station sending distress communication.
Figure 5:
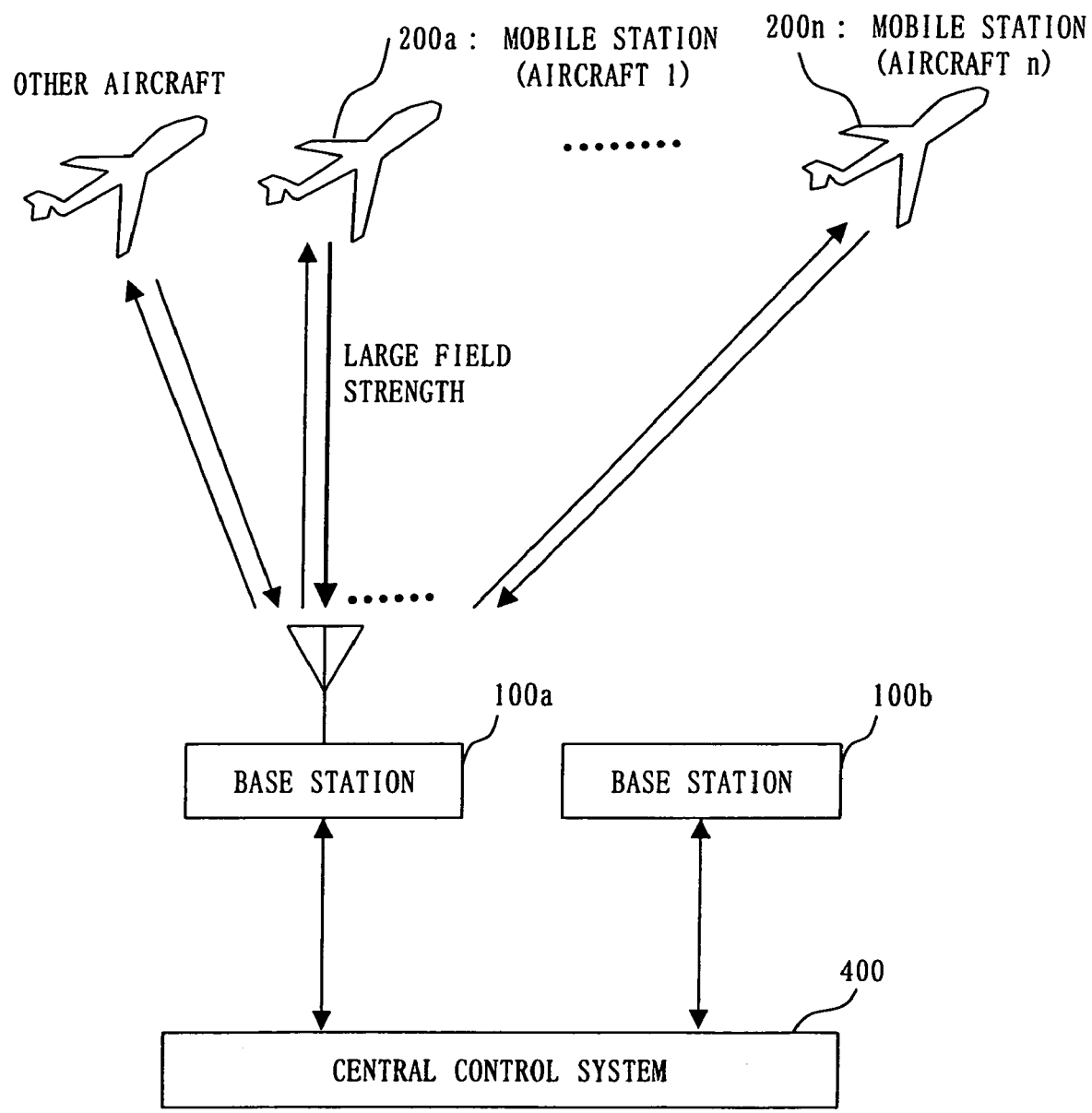
FIG. 5 shows a whole structure of communication system where a plurality of mobile stations send communication for emergency situation.
Figure 6:
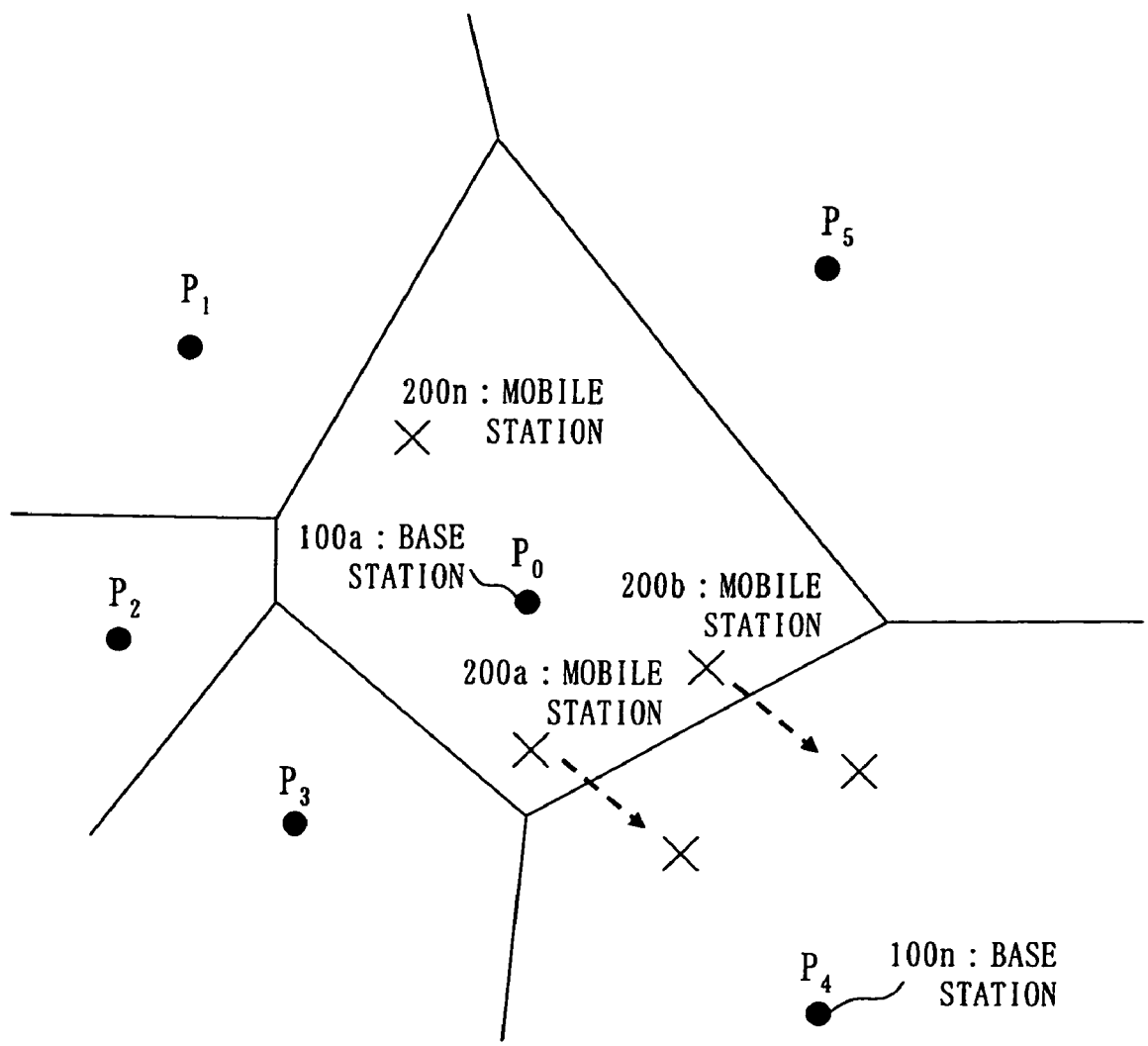
FIG. 6 is Voronoi Diagram where $P_0$-$P_5$ are generatrices.
Figure 7:
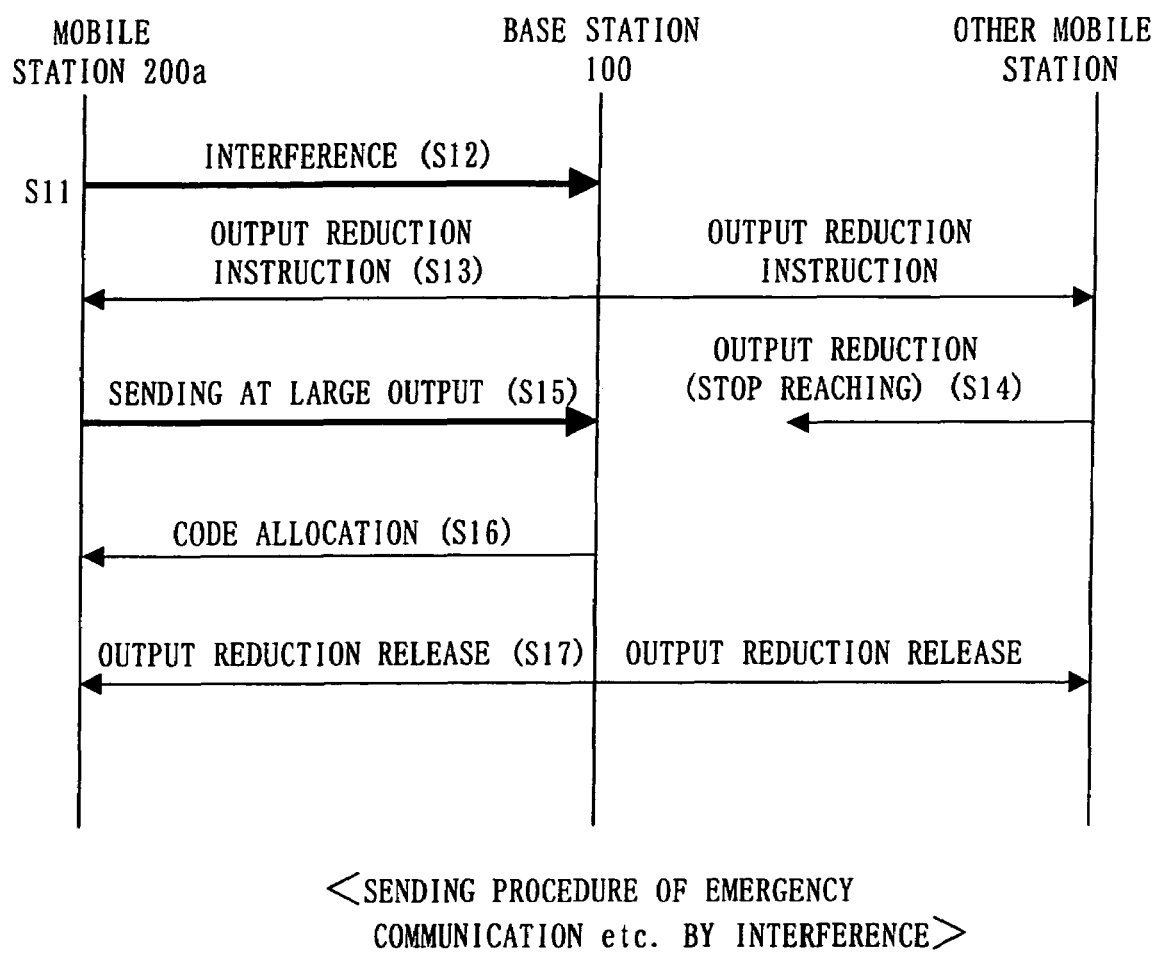
FIG. 7 shows sending procedure of communication for emergency situation by interfering.
Figure 8:
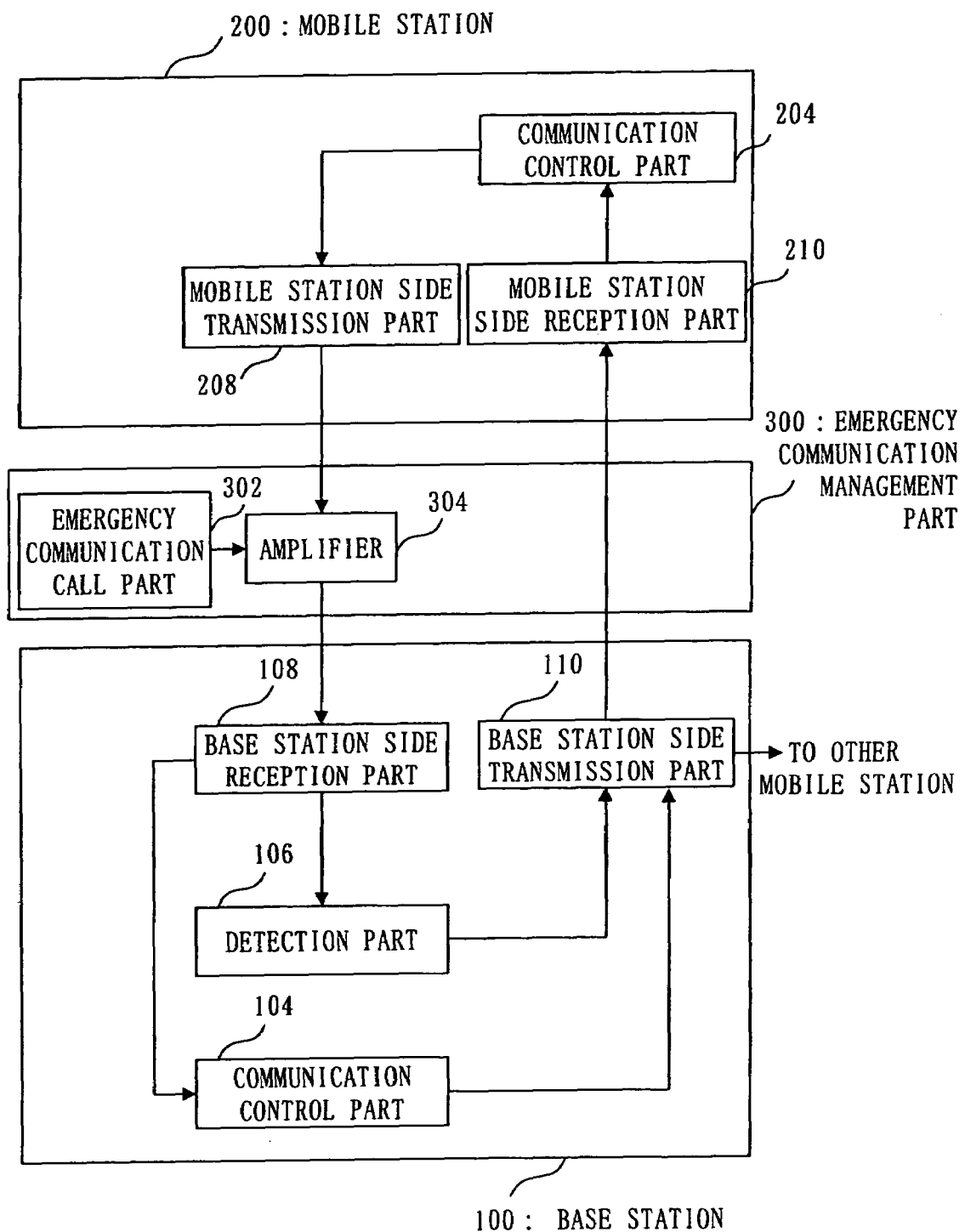
FIG. 8 shows another internal structure of a base station and a mobile station.
Figure 9:
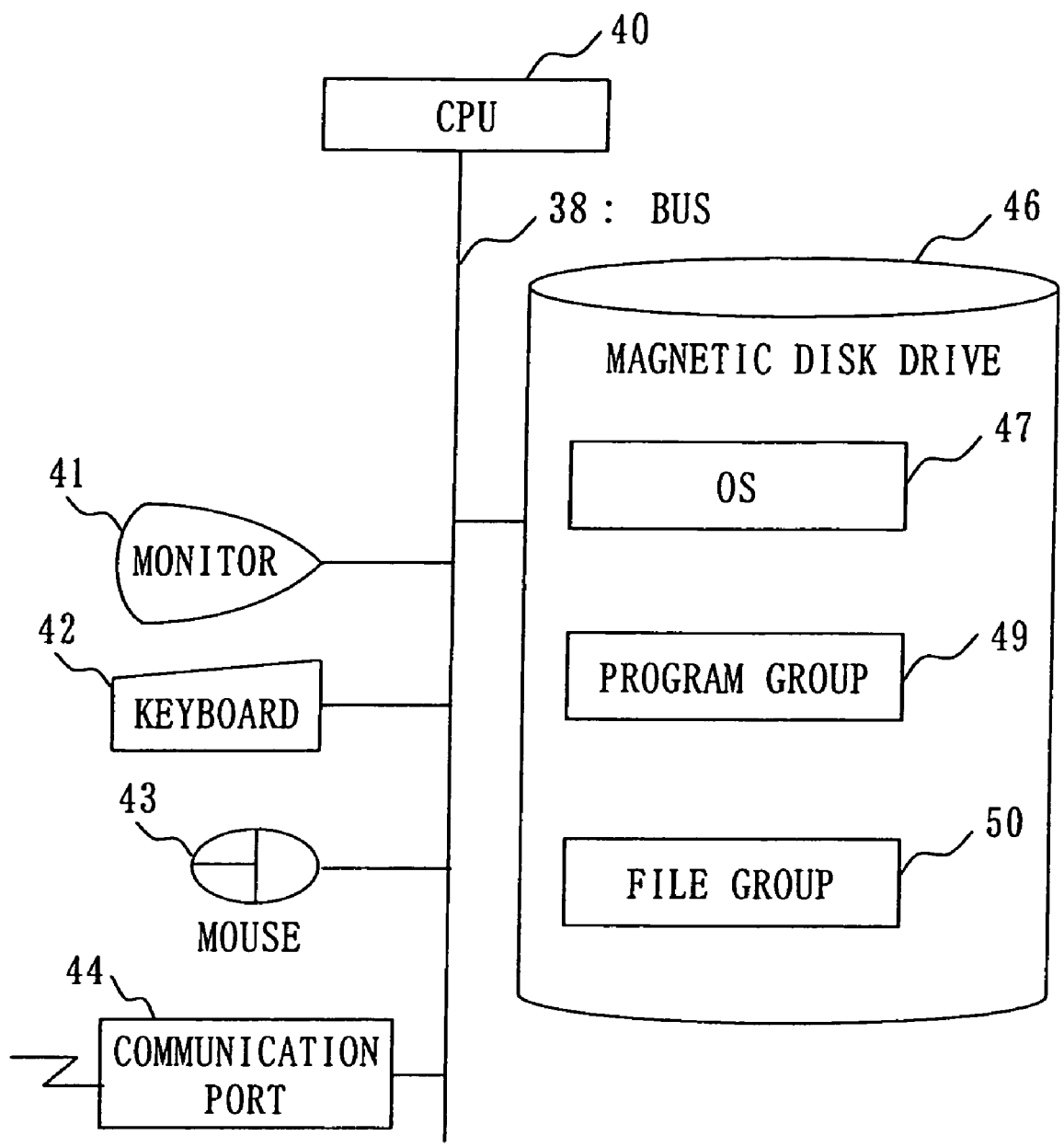
FIG. 9 shows a computer basic structure of a base station and a mobile station.

The invention claimed is:

1. A mobile station which communicates with a base station comprising:
   an emergency communication call part to request to initiate a call of communication for emergency situation, in time of emergency;
   an output control part, in response to a request from the emergency communication call part, to control field strength of a signal to be used for the communication for emergency situation so that the communication for emergency situation will be established at the field strength, with submerging communication between other mobile stations and the base station; and
   a mobile station side transmission part to transmit a call signal of the communication for emergency situation to the base station, at the field strength controlled by the output control part,
   wherein after the mobile station side communication part transmits the call signal of the communication for emergency situation, the output control part ignores a suppression signal of the field strength transmitted from the base station until channel for emergency situation to the base station is established in response to the call signal, and after the channel for emergency situation is established, suppresses the field strength to be normal field strength, and
   after the channel for emergency situation to the base station is established, the mobile station side transmission part performs the communication for emergency situation with the base station at the normal field strength controlled by the output control part.

2. The mobile station of claim 1, wherein the output control part increases the field strength of the call signal until the field strength becomes strong enough for a signal to be decoded, the signal being received by the base station from the mobile station in case of the communication for emergency situation, with submerging a signal received by the base station from the mobile station in case of normal communication.

3. The mobile station of claim 1, wherein the output control part continues to retain the field strength to be strong enough to establish the communication for emergency situation with submerging the communication between the other mobile stations and the base station until the communication for emergency situation with the base station is completed.

4. The mobile station of claim 1, wherein the mobile station side transmission part transmits identification information indicating to be the communication for emergency situation, together with the call signal of the communication for emergency situation, at emergency field strength controlled by the output control part.

5. The mobile station of claim 1, wherein the mobile station side transmission part continues to transmit the call signal of the communication for emergency situation to the base station at emergency field strength controlled by the output control part, until channel for emergency situation to the base station is established.

6. The mobile station of claim 1, wherein
   in time of an emergency of an aircraft or a ship, the emergency communication call part requests to initiate a call of distress communication as the call of the communication for emergency situation, and
   the output control part, in response to the request of the emergency communication call part, controls the field strength used for communication with the base station so that the communication for emergency situation will be established at the field strength, with submerging the communication between the other mobile stations and the base station.

7. The mobile station of claim 1, wherein
   the emergency communication call part requests to initiate a call of at least one of emergency communication, safety communication, or extraordinary communication, as the call of the communication for emergency situation, and
   the output control part, in response to the request of the emergency communication call part, controls the field strength being an antenna power in a range not against laws and used for communication with the base station so that the communication for emergency situation will be established at the field strength, with submerging the communication between the other mobile stations and the base station.

8. The mobile station of claim 1, wherein
   the emergency communication call part requests to initiate a call of at least one of emergency communication, safety communication, or extraordinary communication, as the call of the communication for emergency situation, and
   the output control part, in response to the request of the emergency communication call part, controls the field strength being an antenna power in a range not against laws and used for communication with the base station by using directivity of an antenna, so that the communication for emergency situation will be established at the field strength, with submerging the communication between the other mobile stations and the base station.

9. A method for controlling mobile station side communication, which communicates with a base station, comprising:
   requesting to initiate a call of communication for emergency situation, in time of emergency;
   in response to the requesting to initiate the call of the communication for emergency situation, controlling field strength of a signal to be used for the communication for emergency situation so that the communication for emergency situation will be established at the field strength, with submerging communication between other mobile stations and the base station;
   transmitting a call signal of the communication for emergency situation to the base station, at the field strength controlled; and
   ignoring a suppression signal of the field strength transmitted from a base station until a channel for emergency situation to the base station is established in response to the call signal, and after the channel for emergency situation is established, suppressing the field strength to be normal field strength, and
   wherein after the channel for emergency situation to the base station is established, a mobile station side transmission part performs the communication for emergency situation with the base station at the normal field strength controlled by an output control part.

10. A base station which communicates with a plurality of mobile stations comprising:
   a base station side reception part to receive signals transmitted from the plurality of mobile stations;
   a detection part to detect a call signal of communication for emergency situation from the signals received by the base station side reception part, based on field strength of the signals received; and a base station side transmission part to transmit an assignment signal for assigning channel for emergency situation to a mobile station which sent the call signal of the communication for emergency situation detected by the detection part, wherein, in case of the detection part detecting the call signal of the communication for emergency situation, the base station side transmission part transmits suppression signals of the field strength to the plurality of mobile stations, and transmits the assignment signal to the mobile station with which communication does not stop even by the suppression signals of the field strength transmitted.

11. The base station of claim 10, wherein the base station side transmission part transmits the assignment signal for assigning all or a part of assignable channel to the mobile station which sent the call signal of the communication for emergency situation detected by the detection part.

12. The base station of claim 10, wherein the base station side transmission part transmits signals directing a reduction of the field strength, a keeping of a present condition of the field strength, or a physical disconnection of normal communication, to mobile stations, as the suppression signals of the field strength.

13. A method for controlling base station side communication, which communicates with a plurality of mobile stations, comprising:

receiving signals transmitted from the plurality of mobile stations;

detecting a call signal of communication for emergency situation from the signals received, based on field strength of the signals received;

upon detection of communication for emergency, transmitting suppression signals of the field strength to the plurality of mobile stations; and transmitting an assignment signal for assigning channel for emergency situation to a mobile station which sent the call signal of the communication for emergency situation detected.

14. A communication system where a base station and a plurality of mobile stations communicate comprising, each mobile station of the plurality of mobile stations including:

an emergency communication call part to request to initiate a call of communication for emergency situation, in time of emergency;

an output control part, in response to a request from the emergency communication call part, to control field strength to be used for the communication for emergency situation so that the communication for emergency situation will be established at the field strength, with submerging communication between other mobile stations and the base station and to ignore a suppression signal of the field strength transmitted from the base station until a channel for emergency situation to the base station is established in response to the call signal; and a mobile station side transmission part to transmit a call signal of the communication for emergency situation to the base station, at the field strength controlled by the output control part, and the base station including:

a base station side reception part to receive signals transmitted from the plurality of mobile stations;

a detection part to detect a call signal of communication for emergency situation from the signals received by the base station side reception part, based on field strength of the signals received and to transmit suppression signals to the plurality of mobile stations upon detection of a call signal of communication for emergency situation; and a base station side transmission part to transmit an assignment signal for assigning channel for emergency situation to a mobile station which sent the call signal of the communication for emergency situation detected by the detection part.

15. The communication system of claim 14, wherein the communication system includes a plurality of base stations, and each base station of the plurality of base stations is located so that a coverage area of the each base station may not overlap and independently performs normal communication and communication for emergency situation with the plurality of mobile stations existing in the coverage area of the each base station.

16. A computer readable medium having stored there on a program, having computer executable instructions, for controlling mobile station side communication, which communicates with a base station, comprising:

processing of requesting to initiate a call of communication for emergency situation, in time of emergency;

in response to the requesting to initiate the call of the communication for emergency situation, processing of controlling field strength of a signal to be used for the communication for emergency situation so that the communication for emergency situation will be established at the field strength, with submerging communication between other mobile stations and the base station and processing of ignoring a suppression signal of the field strength transmitted from the base station until a channel for emergency situation to the base station is established in response to the call signal; and processing of transmitting a call signal of the communication for emergency situation to the base station, at the field strength controlled.

17. A computer readable medium having stored thereon a program, having computer executable instructions, for controlling base station side communication, which communicates with a plurality of mobile stations, comprising:

processing of receiving signals transmitted from the plurality of mobile stations;

processing of detecting a call signal of communication for emergency situation from the signals received, based on field strength of the signals received and processing of transmitting suppression signals to the plurality of mobile stations upon detection of a call signal of communication for emergency situation; and processing of transmitting an assignment signal for assigning channel for emergency situation to a mobile station which sent the call signal of the communication for emergency situation detected.

* * * * *